(12) United States Patent
Kim et al.

(10) Patent No.: US 10,706,070 B2
(45) Date of Patent: Jul. 7, 2020

(54) CONSISTENT DEDUPLICATED SNAPSHOT GENERATION FOR A DISTRIBUTED DATABASE USING OPTIMISTIC DEDUPLICATION

(71) Applicant: Rubrik, Inc., Palo Alto, CA (US)

(72) Inventors: Hyo Jun Kim, San Jose, CA (US); Maohua Lu, Fremont, CA (US); Prasenjit Sarkar, Los Gatos, CA (US); Pin Zhou, San Jose, CA (US); Ajaykrishna Raghavan, Santa Clara, CA (US)

(73) Assignee: RUBRIK, INC., Palo Alto, CA (US)

( * ) Notice: Subject to any disclaimer, the term of this patent is extended or adjusted under 35 U.S.C. 154(b) by 752 days.

(21) Appl. No.: 15/260,491

(22) Filed: Sep. 9, 2016

(65) Prior Publication Data
US 2017/0068685 A1    Mar. 9, 2017

Related U.S. Application Data

(60) Provisional application No. 62/216,096, filed on Sep. 9, 2015.

(51) Int. Cl.
*G06F 16/00* (2019.01)
*G06F 16/27* (2019.01)
*G06F 11/14* (2006.01)

(52) U.S. Cl.
CPC ......... *G06F 16/27* (2019.01); *G06F 11/1453* (2013.01); *G06F 2201/80* (2013.01); *G06F 2201/82* (2013.01); *G06F 2201/84* (2013.01)

(58) Field of Classification Search
CPC ...... G06F 16/27; G06F 11/14; G06F 11/1453; G06F 2201/84; G06F 2201/80; G06F 2201/82
See application file for complete search history.

(56) References Cited

U.S. PATENT DOCUMENTS

| | | | |
|---|---|---|---|
| 8,812,897 B1 * | 8/2014 | Helmick | G06F 11/00 714/4.11 |
| 9,256,368 B2 * | 2/2016 | Welnicki | G06F 3/0608 |
| 9,417,947 B1 * | 8/2016 | Massicotte | G06F 11/0769 |
| 9,798,607 B1 * | 10/2017 | Kulkarni | G06F 11/0778 |
| 2013/0173539 A1 * | 7/2013 | Gilder | G06F 16/273 707/622 |

(Continued)

*Primary Examiner* — Leslie Wong
(74) *Attorney, Agent, or Firm* — Schwegman Lundberg & Woessner, P.A.

(57) ABSTRACT

Embodiments disclosed herein provide systems, methods, and computer readable media for generating a consistent deduplicated snapshot of a distributed database using optimistic deduplication. In a particular embodiment, a method provides, for each node of a plurality of nodes in the distributed database, deduplicating data items stored on the node that are owned by the node and generating a summary that describes a file in which the data items are located. The method further provides identifying from the summaries for each of the nodes whether mistakes occurred during deduplication and, upon identifying one or more mistakes, determining one or more corrections for the one or more mistakes. Also, the method provides generating a consistent deduplicated snapshot for the distributed database comprising the deduplicated data items from each node and the one or more corrections.

18 Claims, 5 Drawing Sheets

(56) References Cited

U.S. PATENT DOCUMENTS

| | | | | |
|---|---|---|---|---|
| 2013/0311434 | A1* | 11/2013 | Jones | G06F 3/061 |
| | | | | 707/692 |
| 2014/0181575 | A1* | 6/2014 | Kalach | G06F 11/1415 |
| | | | | 714/6.11 |
| 2015/0278324 | A1* | 10/2015 | Wong | G06F 11/08 |
| | | | | 707/634 |
| 2015/0356005 | A1* | 12/2015 | Hayes | G06F 12/0238 |
| | | | | 711/102 |
| 2016/0142483 | A1* | 5/2016 | Nallathambi | G06F 16/27 |
| | | | | 707/639 |
| 2016/0253254 | A1* | 9/2016 | Krishnan | G06F 11/3612 |
| | | | | 717/124 |
| 2016/0306560 | A1* | 10/2016 | Maranna | G06F 16/1748 |
| 2016/0306709 | A1* | 10/2016 | Shaull | G06F 11/1458 |
| 2017/0116074 | A1* | 4/2017 | Hayes | G06F 11/1076 |

\* cited by examiner

CONSISTENT DEDUPLICATED SNAPSHOT GENERATION FOR A DISTRIBUTED DATABASE USING OPTIMISTIC DEDUPLICATION

RELATED APPLICATIONS

This application is related to and claims priority to U.S. Provisional Patent Application 62/216,096, titled "CONSISTENT DEDUPLICATED SNAPSHOT GENERATION FOR A DISTRIBUTED DATABASE USING OPTIMISTIC DEDUPLICATION," filed Sep. 9, 2015, and which is hereby incorporated by reference in its entirety.

TECHNICAL BACKGROUND

Generating snapshots of a distributed database may be difficult due, in part, to the database not being strongly consistent across the various nodes of the distributed database. That is, at any one time, data changes on one or more of the nodes may not be fully synchronized with other nodes and are therefore inconsistent with those other nodes. Additionally, snapshots are difficult since it is impossible to capture the states of all nodes at exactly the same time without freezing data changes on the nodes while the snapshot is generated. It is not practicable to freeze large databases for the amount of time needed to generate a snapshot. Moreover, in distributed database, each data usually has multiple copies. To improve the space utilization, the snapshot should get rid of the redundancy and contain only one piece of the data. Therefore, to generate a consistent deduplicated snapshot, each node is typically scanned multiple times to ensure consistency, which involves a relatively large amount of time and processing power.

OVERVIEW

Embodiments disclosed herein provide systems, methods, and computer readable media for generating a consistent deduplicated snapshot of a distributed database using optimistic deduplication. In a particular embodiment, a method provides, for each node of a plurality of nodes in the distributed database, deduplicating data items stored on the node that are owned by the node and generating a summary that describes a file in which the data items are located. The method further provides identifying from the summaries for each of the nodes whether one or more mistakes occurred during deduplication and, upon identifying one or more mistakes, determining one or more corrections for the one or more mistakes. Also, the method provides generating a consistent deduplicated snapshot for the distributed database comprising the deduplicated data items from each node and the one or more corrections.

In some embodiments, identifying the one or more mistakes comprises determining a quorum indicating a minimum amount of the plurality of nodes on which a particular data item is stored and using the summaries to determine whether data items of the plurality of data items meet the quorum.

In some embodiments, identifying the one or more mistakes further comprises, for particular data items that do not meet the quorum, identifying the particular data items for inclusion in the one or more mistakes.

In some embodiments, determining the one or more corrections comprises, for the particular data items, determining that the particular data items should be excluded from the deduplicated data items and creating a correction to exclude the particular data item from the deduplicated data items.

In some embodiments, identifying the one or more mistakes further comprises, for particular data items that do meet the quorum and are not included in the deduplicated data items from each node, identifying the particular data items for inclusion in the one or more mistakes.

In some embodiments, determining the one or more corrections comprises, for the particular data items, determining that the particular data items should be included in the deduplicated data items and creating a correction to include the particular data item in the deduplicated data items.

In some embodiments, generating the consistent deduplicated snapshot comprises applying the one or more corrections to the deduplicated data items before storing the consistent deduplicated snapshot.

In some embodiments, generating the consistent deduplicated snapshot comprises storing the one or more corrections in association with the deduplicated data items, wherein the one or more corrections are made to the deduplicated data items upon restoration to the deduplicated snapshot.

In some embodiments, the method further includes storing the consistent deduplicated snapshot to a version storage repository.

In another embodiment, a system including one or more computer readable storage media and a processing system operatively coupled with the one or more computer readable storage media is provided. Program instructions stored on the one or more computer readable storage media, when read and executed by the processing system, direct the processing system to at least, for each node of a plurality of nodes in the distributed database, deduplicate data items stored on the node that are owned by the node and generating a summary that describes a file in which the data items are located. The program instructions further direct the processing system to identify from the summaries for each of the nodes whether one or more mistakes occurred during deduplication and, upon identifying the one or more mistakes, determine one or more corrections for the one or more mistakes. Also, the program instructions direct the processing system to generate a consistent deduplicated snapshot for the distributed database comprising the deduplicated data items from each node and the one or more corrections.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

As noted above, a distributed database is generally not consistent since it takes time for changes to data on any given node to propagate to other nodes of the database. Moreover, the distributed nature of the database nodes makes it impossible to capture a snapshot of each node at the exact same time without freezing the database, which is not a practical solution. While it may be possible to create a consistent snapshot by scanning each node's data multiple times, that approach is very time and processor intensive. In contrast, the examples provided herein generate a consistent deduplicated snapshot of a distributed database to a level of consistency desired by a user while only requiring a single data scanning pass of each node.

Figure 1:
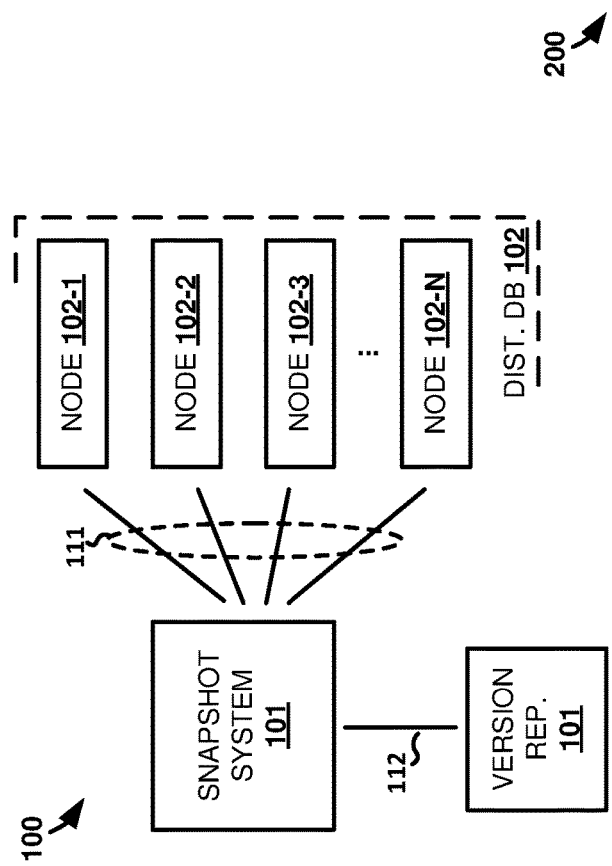
FIG. 1 illustrates a computing environment for generating a consistent deduplicated snapshot of a distributed database using optimistic deduplication.

FIG. 1 illustrates computing environment 100 in an example scenario for generating a consistent deduplicated snapshot of a distributed database using optimistic deduplication. Computing environment 100 includes snapshot system 101, distributed database 102, and version storage repository 103. Distributed database 102 is made up of nodes 102-1-102-N. Snapshot system 101 and distributed database 102 communicate over communication links 111. Snapshot system 101 and version storage repository 103 communicate over communication link 112.

Distributed database 102 may be a NoSQL distributed database, such as Cassandra or Mongo databases and the like. For example, nodes 102-1-102-N may be nodes of a Cassandra database cluster. Data items stored in a typical distributed database are often replicated across the nodes that comprise the database. Therefore, when a consistent deduplicated snapshot is to be generated of database 102's data, some data that needs to be replicated to other nodes may not have propagated to all intended nodes. Snapshot system 101 therefore generates a snapshot of distributed database 102 by optimistically capturing data at each node independently of other nodes. That is, snapshot system 101 captures data for a given node regardless of whether at least some of that data should actually be included in the consistent deduplicated snapshot. Snapshot system 101 then corrects the captured data without having to rescan nodes based on information gleaned from the data captured from other nodes.

Figure 2:
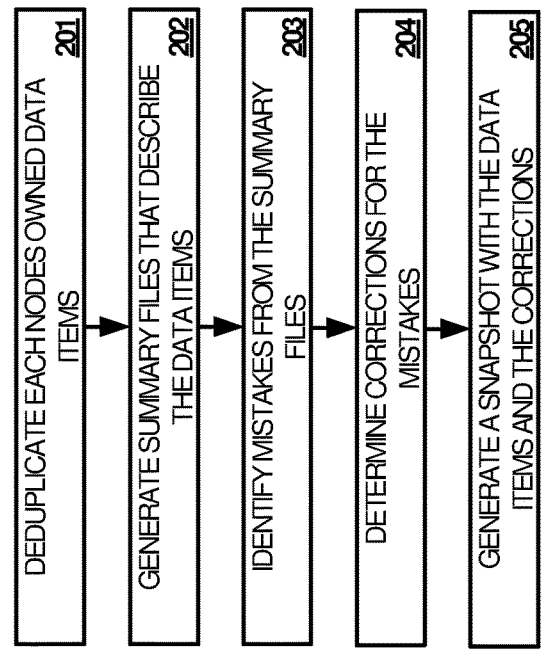
FIG. 2 illustrates an operation of the computing environment to generate a consistent deduplicated snapshot of a distributed database using optimistic deduplication.

FIG. 2 illustrates operation 200 of computing environment 100 to generate a consistent deduplicated snapshot of a distributed database using optimistic deduplication. Operation 200 may be performed periodically to generate a consistent deduplicated snapshot, upon instruction of a user, upon an event occurring in distributed database 102, or for some other reason. In operation 200, for each node in distributed database 102, snapshot system 101 deduplicates data items stored on the node that are owned by the node (step 201). The data items may include all data items stored on the node or may be a subset of the data items, such as data items that have changed since a previous snapshot, as may be the case snapshot system 101 is an incremental versioning system. Snapshot system 101 then generates a summary that describes a location of the data items (step 202). The summary may include information identifying data items that are not owned but are relevant to the consistent deduplicated snapshot (e.g. have been changed since a previous snapshot), may include information identifying the deduplicated data items, or any other information that may be relevant to the consistent deduplicated snapshot process.

Snapshot system 101 uses the summaries from each of nodes 102-1-102-N to identify for each of the nodes whether mistakes occurred during deduplication (step 203). A mistake may be a data item that is captured by the deduplication that should not be included in a consistent deduplicated snapshot. Alternatively, the mistake may be a data item that was left out but should be included. Since the summaries include information describing the data items at each node, it can be determined relatively quickly which nodes include which data items. In one example, snapshot system 101 may use a quorum to identify mistakes from the summaries. The quorum may be provided by a user of snapshot system 101 or set by some other means. The quorum indicates a minimum number of nodes in distributed database 102 that include a particular data item in order for that data item to be included in the consistent deduplicated snapshot. Accordingly, if a data item that is found in the scan of at least one of nodes 102-1-102-N does not reach the quorum, as indicated in the summaries, then that data item is considered a mistake. For instance, if only nodes 102-1, 102-2, and 102-3 include a particular data item and the quorum is set to five, then that particular data item is a mistake to include in the consistent deduplicated snapshot.

Upon identifying one or more mistakes, snapshot system 101 determines one or more corrections for the one or more mistakes (step 204). As noted in the example above, a mistake may be a data item that should not be included in the consistent deduplicated snapshot. A correction therefore corrects that mistake by removing the data item from the consistent deduplicated snapshot, by providing an instruction to remove the data item should the consistent deduplicated snapshot ever be used for a database restore, or by using some other means of fixing the mistake. Similarly, if a data item is left out when it should be included, the correction may correct the mistake by including the data item in the consistent deduplicated snapshot, by providing an instruction to include the data item should the consistent deduplicated snapshot ever be used for a database restore, or by using some other means of fixing the mistake. A data item may be left out if the node that is the owner of the data item does not include the data item when scanned for deduplication at step 201 but the data item is included in enough of the other nodes to meet the quorum requirement.

Snapshot system 101 then generates a consistent deduplicated snapshot for the distributed database comprising the deduplicated data items from each node and the one or more corrections (step 205). The deduplicated data items from each node do not require further deduplication since only one node will be the owner of any one data item. Thus, the data items are already deduplicated for the entire distributed database 102. In some examples, the corrections may be made to the data items when the consistent deduplicated snapshot is stored. Although, in other examples, the data items may be stored without the corrections having been made and the corrections may be stored in association with the data items as part of the consistent deduplicated snapshot. In those examples, the corrections are only applied to the data items when database 102 is to be restored using the consistent deduplicated snapshot.

Once created, the consistent deduplicated snapshot may be stored to version storage repository 103, which is configured to store snapshots generated by snapshot system 101 as versions of distributed database 102. Should distributed database 102 require recovery to a point in time captured by one of the stored versions, that version need merely be retrieved from version storage repository 103 to repopulate distributed database 102 with the data stored therein.

Advantageously, whenever a consistent deduplicated snapshot is to be generated of distributed database 102, each of nodes 102-1-102-N need only be scanned once for data items. Using the quorum requirement, snapshot system 101 can determine whether data items not propagated to all nodes should still be included in the consistent deduplicated snapshot rather than rescanning to determine whether the data items did in fact propagate.

Figure 3:
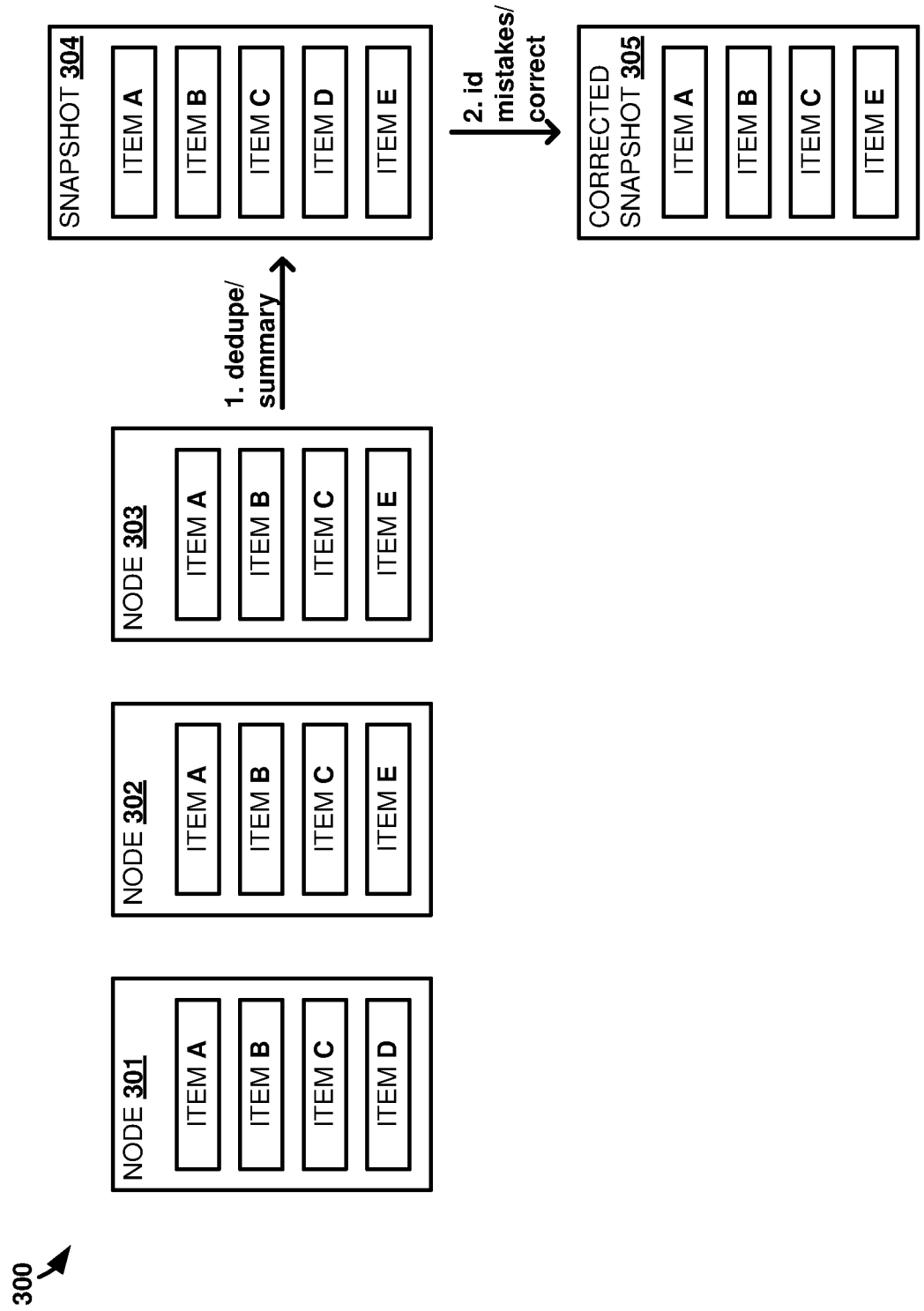
FIG. 3 illustrates another operation of the computing environment for generating a consistent deduplicated snapshot of a distributed database using optimistic deduplication.

FIG. 3 illustrates an operation 300 of computing environment 100 for generating a consistent deduplicated snapshot of a distributed database using optimistic deduplication. Operation 300 shows three nodes 301-303 which are part of a distributed database similar to database 102 in FIG. 1. Node 301 includes data items A-D, node 302 includes data items A-C and E, and node 303 also includes data items A-C and E. For the purposes of this example, node 301 owns data items A and D, node 302 owns data items B and C, and node 303 owns data item E. The quorum in this example is set to two, so any one data item must occur two or more times in the database for that item to be included in the consistent deduplicated snapshot.

At step 1, when a consistent deduplicated snapshot is to be generated for the database, each of nodes 301-303 are scanned to deduplicate their respective owned data items. Data items A and D are deduplicated for node 301, data items B and C are deduplicated for node 302, and data item E is deduplicated for node 303. These deduplicated data items are stored as optimistic snapshot 304 having data items A-E. Further at step 1, summaries are generated for each node 301-303 describing a file from which the data items were scanned. In this case, each node only includes one file for the data items, however, other examples may include multiple files having data items and a separate summary would be generated for each of these multiple files along with the deduplication process performed on each of those files. The summary for node 301 in this example describes that node 301 includes items A-D, the summary for node 302 describes that node 302 includes items A-C and E, and the summary for node 303 describes that node 303 likewise includes items A-C and E.

At step 2, mistakes are identified from the summaries generated at step 1. Specifically, the summaries indicate that data item D is included at node 301 but not nodes 302 and 303. Thus, data item D only occurs once in the database, which is lower than the quorum requirement of two. Optimistic snapshot 304 is therefore corrected by removing data item D from optimistic snapshot 304 to form corrected snapshot 305, which is a consistent deduplicated snapshot. As noted above, corrected snapshot 305 may be stored as the result of the snapshot creation process or optimistic snapshot 304 may be stored along with the corrections generated at step 2 for use to correct optimistic snapshot 304 when restoring data from optimistic snapshot 304.

Figure 4:
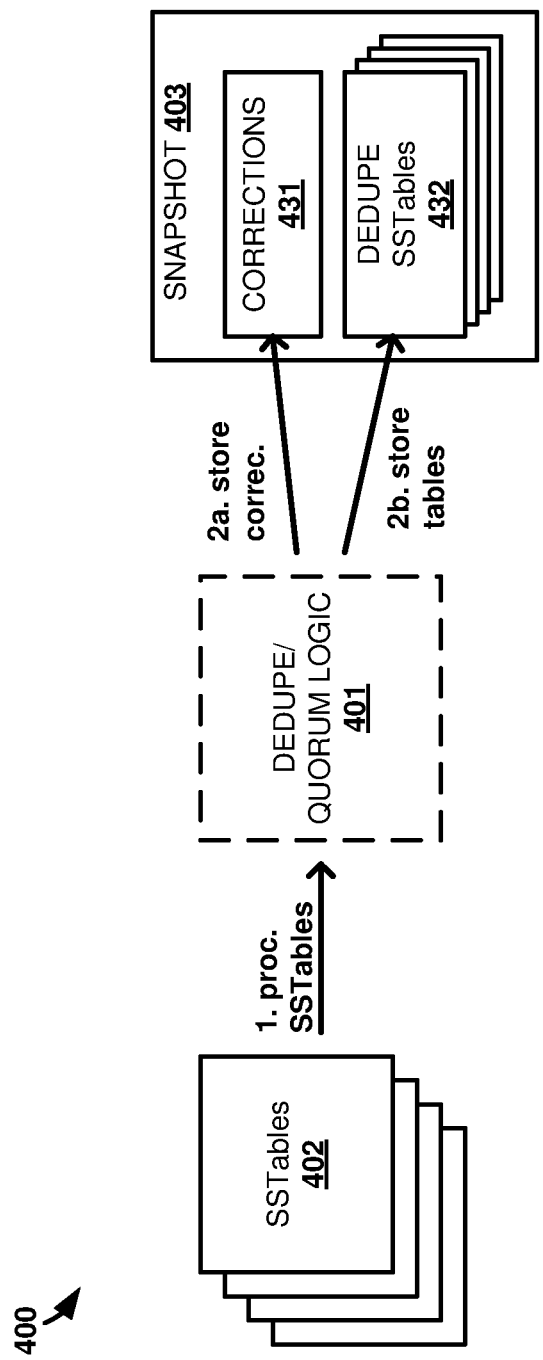
FIG. 4 illustrates yet another operation of the computing environment for generating a consistent deduplicated snapshot of a distributed database using optimistic deduplication.

FIG. 4 illustrates operation 400 of computing environment 100 for generating a consistent deduplicated snapshot of a distributed database using optimistic deduplication. In operation 400, data items from nodes 102-1-102-N that are to be stored as a snapshot are included in Sorted Strings Tables (SSTables) 402. Information describing the data items stored on each of nodes 102-1-102-N may further be included in SSTables 402 or may be included in separate summary files. At step 1, snapshot system 101 processes SSTables 402 using deduplication/quorum processing logic 401. Logic 401 operates on SSTables 402 to deduplicate data items stored therein and determine whether the data items in SSTables 402 meet a quorum requirement. The quorum requirement may be preset in logic 401, may be received by a user/administrator of snapshot system 101, may be adaptive depending on the number of nodes in distributed database 102, or may be determined in some other manner.

At step 2a, the resultant deduplicated SSTables 432 are included in snapshot 403. Likewise, at step 2b, corrections 431 are also stored as part of snapshot 403 (e.g. as a separate correction file with snapshot 403 acting as a container of both corrections 431 and deduplicated SSTables 432). Corrections 431 indicate data items in deduplicated SSTables 432 that should not be included when restoring distributed database 102 using snapshot 403. Also, corrections 431 indicate data items that should be included in deduplicated SSTables 432 when restoring distributed database 102 using snapshot 403. A data item may not have been included if the data item was not owned by any of nodes 102-1-102-N but still existed on enough nodes to meet the quorum requirement. In those cases, corrections 431 may not only include indications that one or more data items should have been included in deduplicated SSTables 432 but also may include the data items themselves. Once identified, those data items may need to be requested from at least one of their storing nodes 102-1-102-N in order for snapshot system 401 to include them in corrections 431.

Operation 400, as described above, is therefore different than operation 300 in that operation 300 would have applied corrections 431 to deduplicated SSTables 432 before storing snapshot 403 to version storage repository 103, which eliminates the need to store corrections 431 in snapshot 403. In contrast, operation 400 allows deduplicated SSTables 432 to remain "as is" and simply stores corrections 431 in snapshot 403 for use in the event snapshot 403 is ever needed for recovery.

Figure 5:
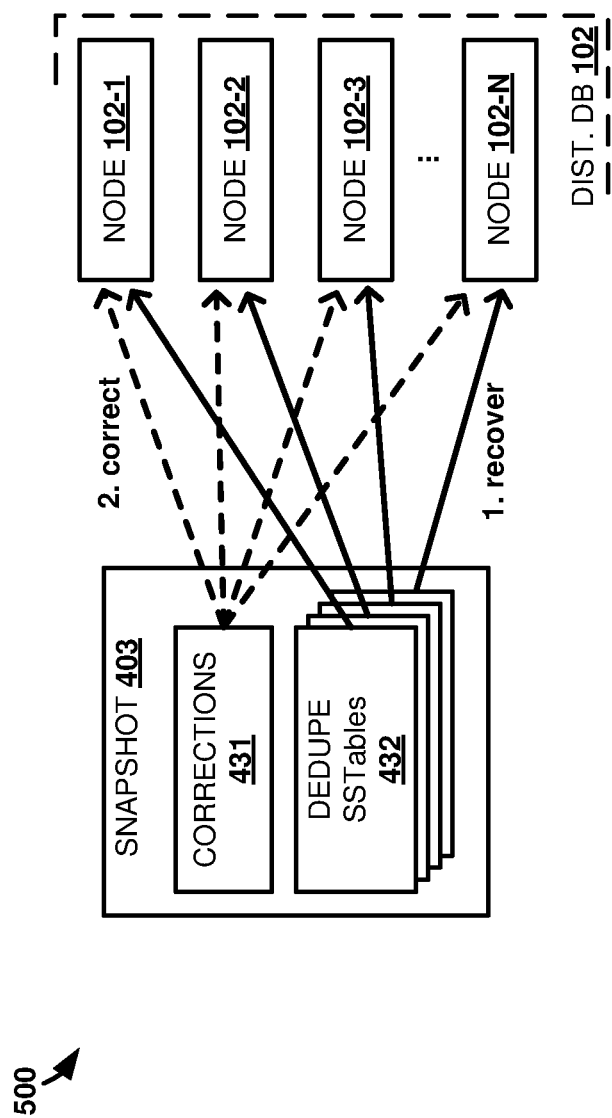
FIG. 5 illustrates a further operation of the computing environment for recovering a distributed database using a consistent deduplicated snapshot.

FIG. 5 illustrates operation 500 of computing environment 100 for recovering a distributed database using a consistent deduplicated snapshot. Specifically, operation 500 describes how snapshot 403 created above is used to recover distributed database 102. In operation 500, snapshot system 101 is also used for recovering distributed database 102 from snapshots stored in version storage repository 103. However, an alternative system may be employed for the recovery process.

Once snapshot system 101 receives an instruction to recover distributed database 102 using snapshot 403, snapshot system 101 retrieves snapshot 403 from version storage repository 103. At step 1, snapshot system 101 recovers nodes 102-1-102-N using the data items in deduplicated SSTables 432. Due to the deduplicated nature of the data items, a single data item in deduplicated SSTables 432 may need to be replicated across multiple nodes depending on which node had stored the data item when snapshot 403 was created. After the data items have been recovered to nodes 102-1-102-N, snapshot system 101 applies corrections 431 at step 2. The application of corrections 431 may include deleting data items from nodes 102-1-102-N that did not meet the quorum requirement and/or adding data items that did meet the quorum requirement but were not included in deduplicated SSTables 432. In some examples, the application of corrections 431 may be performed in conjunction with the recovery of data items. For instance, in those examples, a correction that indicates a particular data item should not be included will simply prevent that data item from being recovered to any of nodes 102-1-102-N in the first place rather than deleting it later on.

If operation 500 had instead described the recovery of distributed database 102 using a snapshot generated in a manner described by operation 300, there would not be any corrections 431 to apply. That is, corrections 431 will have already been applied to deduplicated SSTables 432 before storing the snapshot in version storage repository 103. Thus, recovering such a snapshot would merely require recovering the data items in already corrected deduplicated SSTables 432.

Referring back to FIG. 1, snapshot system 101 comprises a computer system and communication interface. Snapshot system 101 may also include other components such as a router, server, data storage system, and power supply. Snapshot system 101 may reside in a single device or may be distributed across multiple devices. Snapshot system 101 could be an application server(s), a personal workstation, or some other network capable computing system—including combinations thereof. While shown separately, all or portions of snapshot system 101 could be integrated with the components of at least one of nodes 102-1-102-N.

Nodes 102-1-102-N of distributed database 102 each comprise one or more data storage systems having one or more non-transitory storage medium, such as a disk drive, flash drive, magnetic tape, data storage circuitry, or some other memory apparatus. The data storage systems may also include other components such as processing circuitry, a network communication interface, a router, server, data storage system, user interface and power supply. The data storage systems may reside in a single device or may be distributed across multiple devices.

Version storage repository 103 likewise comprises a data storage system having one or more non-transitory storage medium, such as a disk drive, flash drive, magnetic tape, data storage circuitry, or some other memory apparatus. Version storage repository 103 may also include other components such as processing circuitry, a network communication interface, a router, server, data storage system, user interface and power supply. Version storage repository 103 may reside in a single device or may be distributed across multiple devices. Also, while shown separately, version storage repository 103 may be incorporated into snapshot system 101.

Communication links 111-112 could be internal system busses or use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

Figure 6:
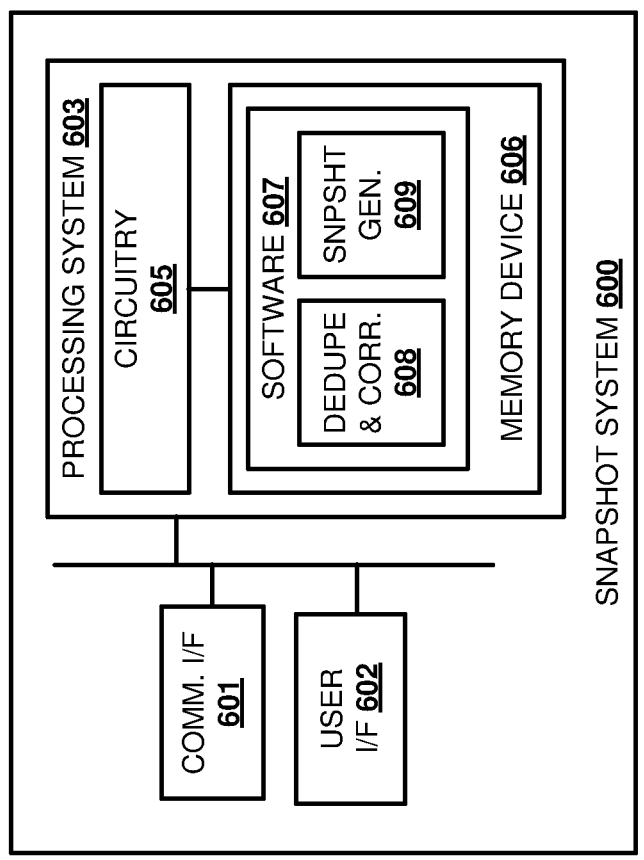
FIG. 6 illustrates a snapshot system for generating a consistent deduplicated snapshot of a distributed database using optimistic deduplication.

FIG. 6 illustrates snapshot system 600. Snapshot system 600 is an example of snapshot system 101, although system 101 may use alternative configurations. Snapshot system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes deduplication and correction module 608 and snapshot generation module 609. Operating software 607 may further include an operating system, utilities, drivers, network interfaces, applications, or some other type of software. When executed by circuitry 605, operating software 607 directs processing system 603 to operate Snapshot system 600 as described herein.

In particular, deduplication and correction module 608 directs processing system 603 to, for each node of a plurality of nodes in the distributed database, deduplicate data items stored on the node that are owned by the node and generating a summary that describes a file in which the data items are located and identify from the summaries for each of the nodes whether one or more mistakes occurred during deduplication. Upon identifying the one or more mistakes, deduplication and correction module 608 directs processing system 603 to determine one or more corrections for the one or more mistakes. Snapshot generation module 609 directs processing system 603 to generate a consistent deduplicated snapshot for the distributed database comprising the deduplicated data items from each node and the one or more corrections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of generating a consistent deduplicated snapshot of a distributed database using optimistic deduplication, the method comprising:
   for each node of a plurality of nodes in the distributed database,
      deduplicating data items that are identified as being stored on the node and owned by the node, and
      generating a summary for the node, the summary describing a file in which the data items that are identified as being stored on the node are located;
   identifying from the summaries for each of the nodes whether one or more mistakes occurred during deduplication;

upon identifying the one or more mistakes, determining one or more corrections for the one or more mistakes; and generating a consistent deduplicated snapshot for the distributed database comprising the deduplicated data items from each node and the one or more corrections.

2. The method of claim 1, wherein identifying the one or more mistakes comprises:

determining a quorum indicating a minimum amount of the plurality of nodes on which a particular data item is stored; and using the summaries to determine whether data items of the plurality of data items meet the quorum.

3. The method of claim 2, wherein identifying the one or more mistakes further comprises:

for particular data items that do not meet the quorum, identifying the particular data items for inclusion in the one or more mistakes.

4. The method of claim 3, wherein determining the one or more corrections comprises:

for the particular data items, determining that the particular data items should be excluded from the deduplicated data items and creating a correction to exclude the particular data item from the deduplicated data items.

5. The method of claim 2, wherein identifying the one or more mistakes further comprises:

for particular data items that do meet the quorum and are not included in the deduplicated data items from each node, identifying the particular data items for inclusion in the one or more mistakes.

6. The method of claim 5, wherein determining the one or more corrections comprises:

for the particular data items, determining that the particular data items should be included in the deduplicated data items and creating a correction to include the particular data item in the deduplicated data items.

7. The method of claim 1, wherein generating the consistent deduplicated snapshot comprises:

applying the one or more corrections to the deduplicated data items before storing the consistent deduplicated snapshot.

8. The method of claim 1, wherein generating the consistent deduplicated snapshot comprises:

storing the one or more corrections in association with the deduplicated data items, wherein the one or more corrections are made to the deduplicated data items upon restoration to the deduplicated snapshot.

9. The method of claim 1, further comprising:

storing the consistent deduplicated snapshot to a version storage repository.

10. A system for generating a consistent deduplicated snapshot of a distributed database using optimistic deduplication, the system comprising:

one or more computer readable storage media;

a processing system operatively coupled with the one or more computer readable storage media; and program instructions stored on the one or more computer readable storage media that, when read and executed by the processing system, direct the processing system to perform operations comprising:

for each node of a plurality of nodes in the distributed database, deduplicating data items that are identified as being stored on the node and owned by the node and generating a summary for the node, the summary describing a file in which the data items that are identified as being stored on the node are located;

identifying from the summaries for each of the nodes whether one or more mistakes occurred during deduplication;

upon identifying the one or more mistakes, determining one or more corrections for the one or more mistakes; and generating a consistent deduplicated snapshot for the distributed database comprising the deduplicated data items from each node and the one or more corrections.

11. The system of claim 10, wherein the identifying the one or more mistakes includes the program instructions directing the processing system to perform operations comprising:

determining a quorum indicating a minimum amount of the plurality of nodes on which a particular data item is stored; and determining whether data items of the plurality of data items meet the quorum based on the summaries.

12. The system of claim 11, wherein the identifying the one or more mistakes includes the program instructions further directing the processing system to perform operations comprising:

for particular data items that do not meet the quorum, identifying the particular data items for inclusion in the one or more mistakes.

13. The system of claim 12, wherein the determining the one or more corrections includes the program instructions directing the processing system to perform operations comprising:

for the particular data items, determining that the particular data items should be excluded from the deduplicated data items and creating a correction to exclude the particular data item from the deduplicated data items.

14. The system of claim 11, wherein the identifying the one or more mistakes includes the program instructions directing the processing system to perform operations comprising:

for particular data items that do meet the quorum and are not included in the deduplicated data items from each node, identifying the particular data items for inclusion in the one or more mistakes.

15. The system of claim 14, wherein the determining the one or more corrections includes the program instructions directing the processing system to perform operations comprising:

for the particular data items, determining that the particular data items should be included in the deduplicated data items and creating a correction to include each of the particular data items in the deduplicated data items.

16. The system of claim 10, wherein the generating the consistent deduplicated snapshot includes the program instructions directing the processing system to perform operations comprising:

applying the one or more corrections to the deduplicated data items before storing the consistent deduplicated snapshot.

17. The system of claim 10, wherein the generating the consistent deduplicated snapshot includes the program instructions directing the processing system to perform operations comprising:

storing the one or more corrections in association with the deduplicated data items, wherein the one or more corrections are made to the deduplicated data items upon restoration to the deduplicated snapshot.

18. The system of claim 10, wherein the program instructions further direct the processing system to perform operations comprising:

storing the consistent deduplicated snapshot to a version storage repository.

\* \* \* \* \*